I. F. PECK.
APPARATUS FOR TREATING ARSENICAL VAPORS.
APPLICATION FILED JAN. 10, 1910.
996,516.
Patented June 27, 1911.
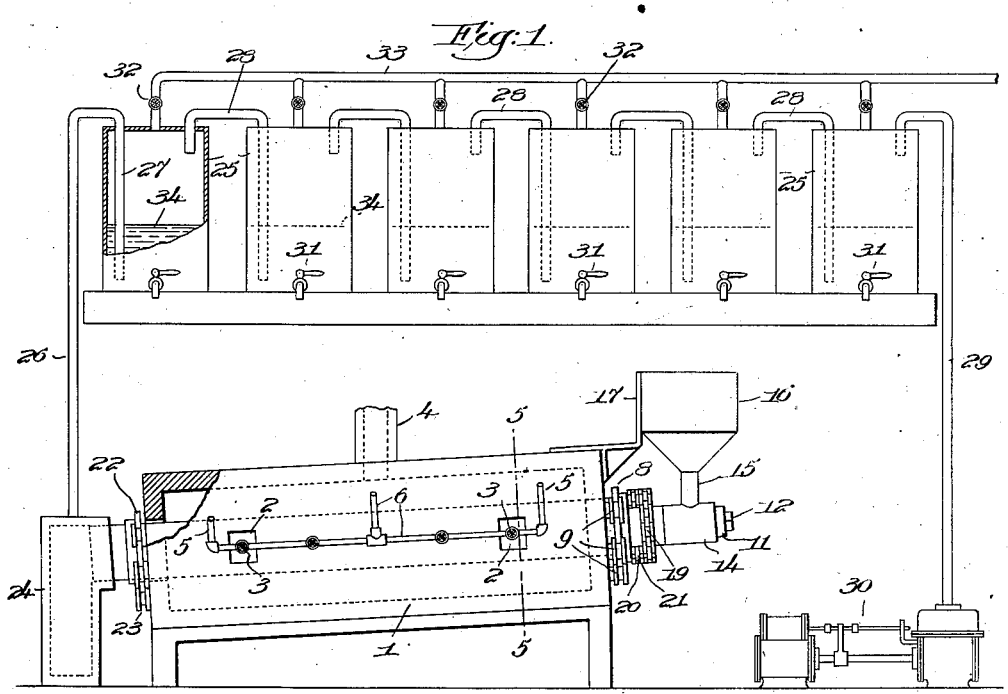
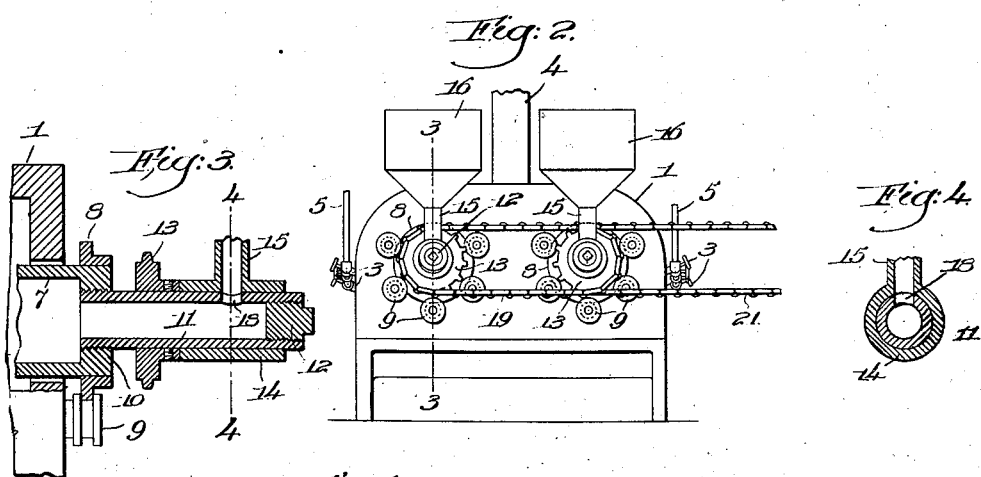
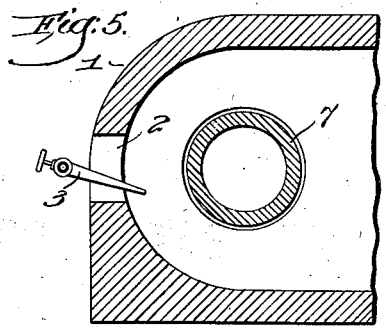

UNITED STATES PATENT OFFICE.

IRA F. PECK, OF PROVIDENCE, RHODE ISLAND, ASSIGNOR TO GEORGE OTIS DRAPER, OF NEW YORK, N. Y.

APPARATUS FOR TREATING ARSENICAL VAPORS.

996,516.  Specification of Letters Patent. Patented June 27, 1911.

Application filed January 10, 1910. Serial No. 537,131.

*To all whom it may concern:*

Be it known that I, IRA F. PECK, a citizen of the United States, and resident of Providence, county of Providence, State of Rhode Island, have invented an Improvement in Apparatus for Treating Arsenical Vapors, of which the following description, in connection with the accompanying drawing, is a specification, like characters on the drawing representing like parts.

This invention has for its object the production of novel, simple and efficient apparatus for treating arsenical vapors, whereby arsenic is freed from the ores containing same and collected and saved in an economical manner and in condition for commercial use.

In carrying out my invention the ore to be treated is pulverized to a convenient size and then subjected to the action of heat in a suitable roasting drum, to vaporize the arsenic.

The arsenic vapors are collected and drawn into a thick creamy mixture of lime and water contained in a closed receptacle, which solution takes up the arsenic as the vapors are cooled and condensed, and in order to effect a rapid conduction of the arsenic vapors from the drum to the collecting receptacle, or receptacles, I connect the same with an exhaust pump, which maintains a strong and continuous current throughout the apparatus.

The several chambers or receptacles which I prefer to use are connected with each other, and with the roasting means, so that the suction draws off the arsenic vapors as fast as they are given off from the ore, and the arsenic is so completely taken up by the lime solutions that the air expelled from the pump is perfectly pure, and free from any trace of arsenic. From time to time the combined lime and arsenic is withdrawn from the collecting chambers and fresh lime solution is introduced as it is needed. The mode of treatment is cheap and efficient, and the recovered arsenic can be used in various industries, one very large field being found in the manufacture of insecticides.

The various novel features of my invention will be fully described in the subjoined specification and particularly pointed out in the following claims.

Figure 1 is a view in elevation and partial section of an apparatus for treating arsenical ores, embodying one form of my present invention; Fig. 2 is a right hand end elevation of the roasting means for the ore, showing the feed hoppers for the rotary drums; Fig. 3 is a longitudinal section, enlarged, through the upper axis of a roasting drum, to show the manner in which the ore is conducted thereinto from the hopper, on the line 3—3, Fig. 2; Fig. 4 is a transverse sectional detail on the line 4—4, Fig. 3; Fig. 5 is an enlarged cross-sectional detail of the furnace and roasting drum, showing one of the burners, and taken on the line 5—5, Fig. 1.

In carrying out my invention I may employ a suitable closed heating chamber or furnace 1, having openings 2 in its side walls for the burner nozzles 3—the latter burning gas or a mixture of air and a vaporized hydrocarbon, as may be most convenient—is arranged to sustain one or more roasting drums.

The furnace has a suitable stack or outlet 4 for the products of combustion, and as shown in Fig. 1 the gas or fuel pipes 5 and air pipes 6 are connected with suitable sources of supply, the furnace being illustrated as inclined in the direction of its length.

Herein I have shown two roasting drums or cylinders 7, arranged side by side, and extending the length of the chamber 1, the upper or high end of each drum having an annular flange 8 outside of the furnace and rotatably supported on grooved rolls 9 mounted on the end wall of the furnace.

The end of the drum is closed by a head 10 having a central opening into which is rigidly secured a tubular extension 11, see Fig. 3, closed at its outer end by a plug 12 and having a fixedly attached sprocket 13. A sleeve 14 loosely surrounds the extension 11 and carries the spout 15 of a hopper 16 supported in any suitable manner, as by a bracket 17 on the furnace, and as the two drums and their appurtenances are alike a detailed description of one will be sufficient. The extension 11 has an opening 18, Fig. 3, which intermittingly registers with the bottom of the spout 15 as the drum revolves, so that the ore contained in the hopper is fed from time to time into the extension and passes thence into the drum 7 at its upper end. As the inclined drum slowly revolves the ore travels down the same, being highly heated and agitated in its passage therethrough, so that the arsenic contained in the ore is vaporized and thereby separated from the ore.

The drum sprockets 13 are connected by an endless sprocket chain 19, Figs. 1 and 2, so that the drums will be rotated in unison, and by means of a second sprocket 20 on one of the drum extensions, and a chain 21, Fig. 2, driven from a suitable source of power, the several drums will be revolved. Each drum at its lower end passes through a hole in the end wall of the furnace, and has attached to it an annular flange 22, Fig. 1, supported by grooved rolls 23, the open end of the drum entering a closed receptacle 24, the ore being discharged thereinto from the outlet of the drum, as will be manifest, and as will be explained the arsenic vapors are drawn from the drum into said receptacle 24 and carried from the latter to preferably a series of collecting chambers or tanks, shown in Fig. 1. A series of large, tightly closed collecting tanks or chambers 25 are shown, arranged side by side, the first one being connected with the receptacle 24 by a pipe 26, the open end of which is downturned within the receptacle, as at 27, and terminating close to its bottom. Each receptacle is connected by a bent pipe 28 with the next receptacle of the series, the inlet of the pipe 28 being near the top of one receptacle while its outlet is near the bottom of the next one, throughout the series, but from the last receptacle the outlet pipe 29 is connected with the inlet or suction side of an exhaust pump 30 of any suitable construction. Draw-off cocks 31 are provided for the receptacles, and filling cocks 32 are provided, as shown, connected with a supply pipe 33. Through this latter pipe a thick creamy mixture of lime and water is introduced to the receptacles 25 as it is needed, the level of the solution in each receptacle always being maintained well above the exit of the pipes 27 or 28 which lead into such receptacles.

Before describing the operation it should be stated that the roasting drums 7 may be made in any suitable manner, and preferably as metal cylinders having a lining of fire brick or other refractory, heat-resisting material. Inasmuch as the pump creates a suction through the entire apparatus it is unnecessary to provide a very tight fit for the lower end of the drum where it enters the receptacle 24, for there is no tendency for the arsenic vapors or fumes to escape thereat. On the contrary there is always a tendency at such point to draw in a slight amount of outside air, and for similar reasons there is no necessity to tightly close the hoppers 16, for the fresh air is drawn into the upper ends of the drum, or drums, through the hoppers.

In the operation of the apparatus, the several chambers or tanks 25 are charged with a suitable quantity of the medium for taking up the arsenic, as for instance, a thick creamy mixture of lime and water, say such as is produced by the mixture of about twenty-five pounds of lime per one hundred gallons of water, the solution being indicated at 34, Fig. 1. The furnace being heated to the proper degree and the drums revolving slowly, the ore is admitted to the drums from the hoppers, and travels slowly down said drums, being thoroughly agitated and heated in such passage to drive off the arsenic in the form of vapor. The operation of pump 30 exhausts the air from the endmost tank 25 of the series or battery, and this exhaustion or suction travels backward through the several tanks by means of the bent or U-shaped connecting pipes 28, and from the first tank of the battery by means of pipe 26 a suction is created in the receptacle 24 and in the drums. Thereby the arsenic vapors are drawn from the drums as fast as they form and pass into the receptacle 24, and therefrom such vapors pass into the solution 34 in the first tank of the battery, the cooling and condensing of such vapors causing the arsenic to be deposited in the solution. Whatever arsenic vapor is not taken care of in the first receptacle passes through the connection 28 to the next receptacle or tank, to be acted upon by the solution therein, and so on to the end of the battery, a sufficient number of the tanks being used to insure the taking up of every particle of arsenic given off from the ore. The powerful suction created by the pump maintains the solution of lime in constant and thorough agitation, so that the lime is not permitted to settle to the bottom of a receptacle. Were it not for such agitation and constant stirring up of the solution the lime would settle and a weak lime water would remain above the same, which could not stop or take up the volume of fumes which are caused by the suction to traverse the apparatus. To put lime water in the receptacles would be of no avail, for the small percentage of lime in lime water would have little or no effect as an absorbent for the arsenic vapors. As a result the air discharged from the pump outlet is perfectly pure and free from arsenic. When the solution in any of the collecting chambers or tanks has absorbed a sufficient quantity of arsenic it can be withdrawn by means of the outlet cock 31, and fresh solution is introduced by the supply cock 32, without interrupting the operation of the apparatus. The roasted ore, free from arsenic, can be removed from the receptacle or ore collector 24 from time to time as may be necessary. By making an inlet, as 18, in the drum extension 11, the ore is fed intermittingly to the drum, so that overloading or charging is obviated.

While I have herein shown two roasting drums it will be manifest that any desired number of drums may be used as may be desirable or convenient.

Various changes or modifications in details of construction and arrangement may be made by those skilled in the art without departing from the spirit and scope of my invention as set forth in the claims annexed hereto.

Having fully described my invention, what I claim as new and desire to secure by Letters Patent is:—

1. In an apparatus of the class described, a closed chamber containing a thick creamy mixture of lime and water, means to convey arsenic vapors thereto below the surface of the mixture to absorb the arsenic therein and suction means connected to said chamber above the mixture to draw the arsenic vapors into the mixture and maintain the mixture in agitation whereby a maximum amount of arsenic is absorbed by said solution.

2. In an apparatus of the class described, a plurality of closed chambers containing a thick creamy mixture of lime and water, a connection leading from one chamber above the solution into the next chamber below the level of the mixture therein, means to convey arsenic vapors to the first of said chambers below the surface of the mixture therein, and means connected with the last of said chambers above the mixture therein to draw the arsenic vapors into the mixture in the several chambers and maintain the mixture in said chambers in agitation, whereby a maximum amount of arsenic is absorbed by the mixture in the several chambers.

In testimony whereof, I have signed my name to this specification, in the presence of two subscribing witnesses.

IRA F. PECK.

Witnesses:
STEPHEN F. PECK,
ORA M. POTTER.